US008245211B2

(12) United States Patent
Gellerich

(10) Patent No.: US 8,245,211 B2
(45) Date of Patent: *Aug. 14, 2012

(54) METHOD AND SYSTEM FOR FINDING PROBLEMS CAUSED BY ACCESS TO PARTIALLY UNINITIALIZED DATA STORAGE WHICH IS ACCESSED USING INDEX EXPRESSIONS

(75) Inventor: Wolfgang Gellerich, Bueblingen (DE)

(73) Assignee: International Business Machines Corporation, Armonk, NY (US)

( * ) Notice: Subject to any disclaimer, the term of this patent is extended or adjusted under 35 U.S.C. 154(b) by 1108 days.

This patent is subject to a terminal disclaimer.

(21) Appl. No.: 12/130,094

(22) Filed: May 30, 2008

(65) Prior Publication Data

US 2008/0307398 A1    Dec. 11, 2008

(30) Foreign Application Priority Data

Jun. 5, 2007    (EP) ..................................... 07109594

(51) Int. Cl.
*G06F 11/36*    (2006.01)
(52) U.S. Cl. ......................... 717/155; 717/156; 717/132
(58) Field of Classification Search .................... 717/155
See application file for complete search history.

(56) References Cited

U.S. PATENT DOCUMENTS

| | | | | |
|---|---|---|---|---|
| 5,175,856 A * | 12/1992 | Van Dyke et al. | ............. | 717/151 |
| 5,313,614 A * | 5/1994 | Goettelmann et al. | ........ | 717/138 |
| 5,842,017 A * | 11/1998 | Hookway et al. | ............. | 717/158 |
| 5,983,213 A * | 11/1999 | Nakano et al. | ......................... | 1/1 |
| 6,748,558 B1 * | 6/2004 | Gonzales et al. | ............ | 714/47.1 |
| 2001/0032215 A1 | 10/2001 | Kyle et al. | | |
| 2001/0037218 A1 | 11/2001 | Kaker et al. | | |
| 2001/0044811 A1 * | 11/2001 | Ballantyne et al. | ........... | 707/513 |
| 2002/0019910 A1 * | 2/2002 | Pitsianis et al. | ............... | 711/125 |
| 2003/0023955 A1 * | 1/2003 | Bates et al. | .................... | 717/129 |
| 2005/0014842 A1 * | 1/2005 | Baumann et al. | ............. | 514/622 |
| 2005/0027953 A1 * | 2/2005 | McIntosh et al. | ............. | 711/158 |
| 2005/0246693 A1 * | 11/2005 | Plum | ............................. | 717/140 |
| 2006/0130021 A1 * | 6/2006 | Plum et al. | .................... | 717/140 |
| 2006/0200754 A1 | 9/2006 | Kablesh et al. | | |
| 2007/0094048 A1 | 4/2007 | Grichnik | | |
| 2007/0198296 A1 | 8/2007 | Pellinat et al. | | |
| 2007/0203753 A1 | 8/2007 | Hasan et al. | | |
| 2007/0271121 A1 | 11/2007 | Laudan et al. | | |
| 2007/0288266 A1 | 12/2007 | Sysko et al. | | |
| 2008/0235567 A1 | 9/2008 | Raj et al. | | |
| 2009/0299761 A1 | 12/2009 | Thakur et al. | | |

OTHER PUBLICATIONS

Cooper et. al "Building a Control Flow-Graph From Scheduled Assembly Code" http://hipersoft.cs.rice.edu/grads/publications, 2002.*

U.S. Appl. No. 11/690,978, Non-Final Office Action dated Jul. 27, 2011; pp. 1-21.

(Continued)

*Primary Examiner* — Li Zhen
*Assistant Examiner* — V Miller
(74) *Attorney, Agent, or Firm* — Cantor Colburn LLP; Dennis Jung

(57) ABSTRACT

The present invention provides a system and method for detecting problems caused by access to incompletely initialized data storage in assembler and high-level language programs. An internal representation of the control flow of the source code of the assembler program is generated and a data-flow analysis method is applied to the internal representation.

10 Claims, 4 Drawing Sheets

OTHER PUBLICATIONS

L. Djoudi et al., "MAQAO: Modular Assembler Quality Analyzer and Optimizer for Itanium 2", Workshop on EPIC Architectures and Compiler Technology; EPIC(4) (Mar. 2005): pp. 1-20 (San Jose, CA).

M.P. Ward et al., "Legacy Assembler Reengineering and Migration", IEEE Computer Society; 20th ICSM, (2004) pp. 157-166.

Abbas, et al., "Adaptive Context for Medical Information Systems", ICDIM'07, 2007 pp. 1-6, IEEE.

Abidi, "A Case Base Reasoning Framework to Author Personalized Health Maintenance Information", IEEE Symposium on Computer-Based Medical Systems (CBMS 2002), 2002, pp. 1-6, IEEE.

Abidi et al., "An Intelligent Info-Structure for Composing and Pushing Personalised Healthcare Information Over the Internet", 14th IEEE Symposium on Computer Based Medical Systems, 2001, pp. 225-230.

Curro et al., "Man-Machine Interfaces to Medical Information Systems", IEEE Engineering in Medicine & Biology Society 10th Annual International Conference—1341 CH2566-8/88/0000—1341, pp. 1-2, 1988, IEEE.

Isern, et al., "Using Aggregation Operators to Personalize Agent-Based Medical Services", KES 2006, Part II, LNAI 4252, 2006, pp. 1256-1263, Springer, Germany.

McRoy et al.; "Interactive Computerized Health Care Edution," JAMIA, [online]; [retrieved on Feb. 4, 2010]; retrieved from the Internet http://jamia.bmj.com/content/5/4/347.full.html Journal of the American Medical Informatics Association, Jul./Aug. 1998, pp. 347-356, vol. 5 No. 4, BMJ group.

Office Action—Final for U.S. Appl. No. 11/690,978, filed Mar. 26, 2007; First Named Inventor: Wolfgang Gellerich; Mail Date: Jan. 4, 2012.

Office Action—Non-Final for U.S. Appl. No. 12/700,339, filed Feb. 4, 2010; First Named Invwentor: Varun Bhagwan; Mail Date: Dec. 22, 2011.

Office Action—Non-Final for U.S. Appl. No. 12/130,094, filed May 30, 2008; First Named Inventor: Wolfgang Gellerich; Mail Date Jul. 26, 2011: pp. 1-22.

Quintana, Y., "Intelligent Medical Information Filtering" [online]; [retrieved on Feb. 4, 2010] retrieved from the Internet www.yuriquintana.com/papers/Quintana-Information-Filtering.pdf; 1998, 17 pages.

Yang, et al., "A Personalized Products Selection Assistance Based on E-Commerce Machine Learning", Proc. of 3rd International Conference on Maching Learning and Cybernetics, 2004, pp. 2629-2633, IEEE.

* cited by examiner

```
1     SET  M(0:3)  "some value"
2     JUMP IF "some condition" TO L1
3     SET  M(3:9)  "some value"
4  L1 SET  M(5:10) "some value"
5     READ M(2:5)
```

The numbers on the left denote the lines and are not part of the program.

FIG. 1

METHOD AND SYSTEM FOR FINDING PROBLEMS CAUSED BY ACCESS TO PARTIALLY UNINITIALIZED DATA STORAGE WHICH IS ACCESSED USING INDEX EXPRESSIONS

FIELD OF THE INVENTION

The invention relates to a method and data processing system for finding problems in programs written in assembler whereby the cause of the problem is an access to data which has not been completely initialized.

BACKGROUND

Any computer program can contain errors. A typical example is reading data which is not or not completely initialized and thus contains unexpected values, causing the affected program to report erroneous results or to behave in some unpredictable way. Prior art for finding such problems are human activities like testing and doing code reviews. Performing tests can be supported by simulators that help to identify the location of a problem. These techniques are used for both, programs written in higher-level programming languages and in assembler. Additionally, there are automated tools for finding problems in higher-level programming language source code. These tools apply techniques summarized under the term static program analysis. The value of such tools is that they run automatically, and that they tend to find problems that are likely to get missed by tests and reviews.

Despite of the advantages higher-level programming languages like C or Java offer, Assembler programming is still in use today. Typical application areas include machine-oriented software, low-level driver routines and software within processors, implementing the assembler instruction the processor provides. A typical example is the so-called Millicode found in System z machines and processors.

Unfortunately, this kind of software development is rather error-prone as there are mistakes typical to assembler programming.

It is common practice in Assembler programming to have bit fields which are neither located on byte nor on word boundaries and can have any size. One tries not to waste even a single bit. This is in particular true for data interfaces to hardware. Again, System z Millicode is a typical example for this programming practice.

FIG. 1 shows an example assembler program consisting of five assembler instructions. All access a certain memory area named M. This can be any contiguous range of memory within a computer system. The application of the present invention is not limited to registers but works also with any arbitrarily large area of main memory. Let M consist of max+1 bits which are numbered from 0 to max. Let the expression M(i) denote an access to bit number i, where the condition $0<=i<=max$ holds. Let M(i:j) denote an access to the contiguous range of all bits from number i to number j, both inclusive, where the condition $0<=i<j<=max$ holds.

The example Assembler program shown in FIG. 1 illustrates the problem to be addressed with the present invention. The instructions in lines 1, 3, and 4, respectively, assign values to the respective bit ranges of memory area M.

However, whether or not the SET instruction in line 3 gets executed or not depends on whether the JUMP instruction in line 2 branches. If the instruction does not branch, all bits from 0 to 10, both inclusive, are initialized. If the JUMP instruction does, however, branch then the SET instruction in line 3 is skipped. The READ instruction in line 5 then reads a value from bit 4 which is not initialized.

One important algorithm used for static program analysis is data-flow analysis which iteratively solves a set of data-flow equations in order to derive information later used for detecting bugs. Data-flow analysis applies a mathematical model based on an arithmetic structure named lattice.

The present invention are software tools that find any instructions in an Assembler source code which potentially access an uninitialized bit, or a only partially initialized sequence of bits, find accesses to uninitialized array elements and accesses to uninitialized record fields.

Prior art for finding such problems is either doing code reviews or extensive testing, possibly with the aid of simulators. Code reviews are, however, expensive and problems of this kind are easily missed. Testing will find the problem only if there is a test case that triggers the erroneous situation. In general, it is the case that the control flow does not just flow straight forward but has plenty of branches, forward jumps and backward jumps. Also, the test case must be designed such that its output depends on the erroneous data access. Using a simulation tool to run the test cases makes the situation somewhat easier as the simulator can perform checks that will detect and report the erroneous access immediately. The disadvantage of this approach is the slow execution time of simulators. Also, the problem persists that there must be a test case triggering the erroneous situation.

There is some other work related to program analysis:

Recently, the so-called post-pass optimization has been introduced into compiler construction. This technique consists of an additional optimization pass after the whole program has been compiled and linked, i.e., the input to the post-pass optimizer is a binary. The advantage of this final pass is that all information is complete, while the compiler usually only operates on parts of the whole program. Post-pass optimizations seem to be most popular for single-chip controllers and similar projects that do not apply dynamic linking. Post-pass optimization may well apply techniques like data-flow analysis to gather information that is later used to decide on certain code optimizations. Post-pass optimization does, however, not try to find problems. In contrast, given that the input is generated by a compiler, it is considered correct. Post-pass optimization is an optimization technique, seeking reduce the run-time and/or space needed by a program, but it is not a software engineering tool.

Currently available techniques of static code analysis are applied to high-level programming but cannot find accesses to incompletely initialized data in assembler programs.

Tools are available which build a control flow graph for assembler programs and provide an interface which allows the user to query some properties of the code. This approach does, however, not apply data-flow techniques.

There is an approach to re-engineer legacy assembler programs yielding high-level source code. The approach translates assembler code into an internal representation and applies several analysis to it. This included data-flow analysis, but only to detect possible bodies of subroutines. The suggested tool does not check assembler programs for correctness.

SUMMARY OF THE INVENTION

An embodiment of the present invention provides a system and method for finding problems caused by access to incompletely initialized data storage in programs written in assembler comprising:

a) Generating an internal representation of control flow of the source code of the program by using standard techniques of compiler constructions, wherein said internal representation contains nodes for every statement found in said source code and a directed edge for every possible flow of control between said nodes, b) Attributing data attributes to said nodes and/or said edges, wherein said data attributes are used to store the information which bits within the data storage can be guaranteed to be initialized, c) Applying a data-flow analysis method to said internal representation of the control flow of the source code for determining which bits of the data storage can be guaranteed to be initialized, comprising:

c1) Initializing all of said attributes of said internal representation of the control flow of the source code with an initial value, c2) Providing access to the following input parameters:

the set of numbers indicating which bits are read by said statement associated to said node, the set of numbers indicating which bits are written by said statement associated to said node, and all attributes of the nodes from which a directed edge to said node for the attribute is currently being calculated, c3) calculating for each of said nodes a value for said attribute associated to said node based on said parameters, c4) repeating calculating step in C3) until for all attributes the newly computed value remains unchanged, d) using the result of step c) and checking for each node whether the instruction reads at least one bit that is not guaranteed to be initialized, and e) taking an appropriate action in order to overcome said problem.

A further embodiment of the present invention is easily extended to check more than just one memory area.

A further embodiment of the present invention is to use techniques which are known to improve the representation of the CFG with respect to execution time and/or space. One approach is that nodes do not contain single instructions but so-called basic blocks which consist of a linear sequence of instructions which does not have any branches internally.

A further embodiment of the present invention provides an optimization of the CFG representation by using the static single assignment form (SSA). This technique reduces the overhead for propagating data-flow information through the CFG.

A further embodiment of the present invention uses an additional function to trace the calculation of data-flow information and output possible flows of execution that lead to an error message. This would help users locating the problem.

BRIEF DESCRIPTION OF THE DRAWINGS

In the following, preferred embodiments of the invention will be described in greater detail by making reference to the drawings in which:

FIG. 1 shows an example for an assembler program that has a problem caused by a possible access to an uninitialized register.

DETAILED DESCRIPTION OF THE INVENTION

Figure 2:
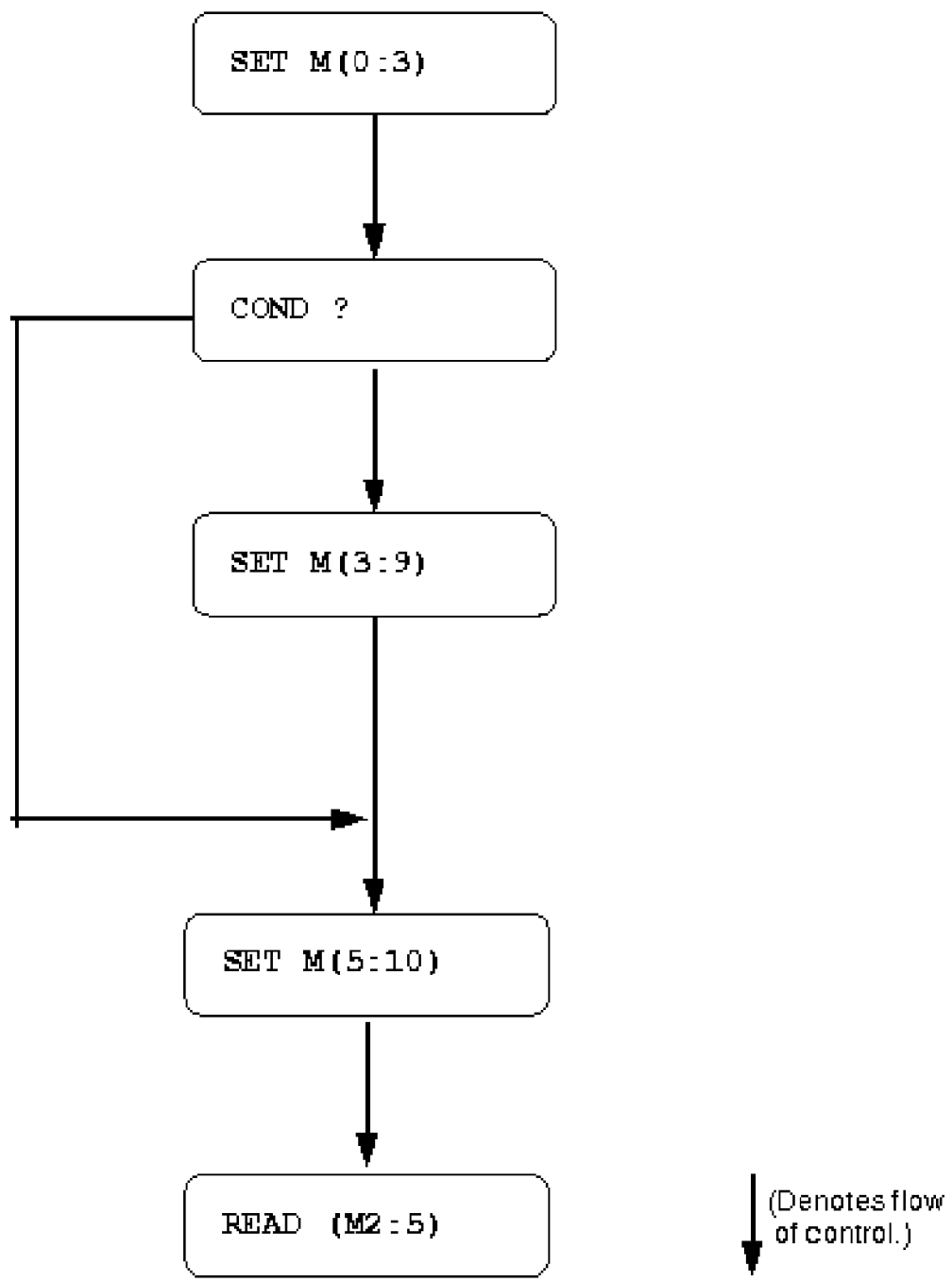
FIG. 2 shows the control-flow graph derived from the example assembler program in FIG. 1.
Figure 3:
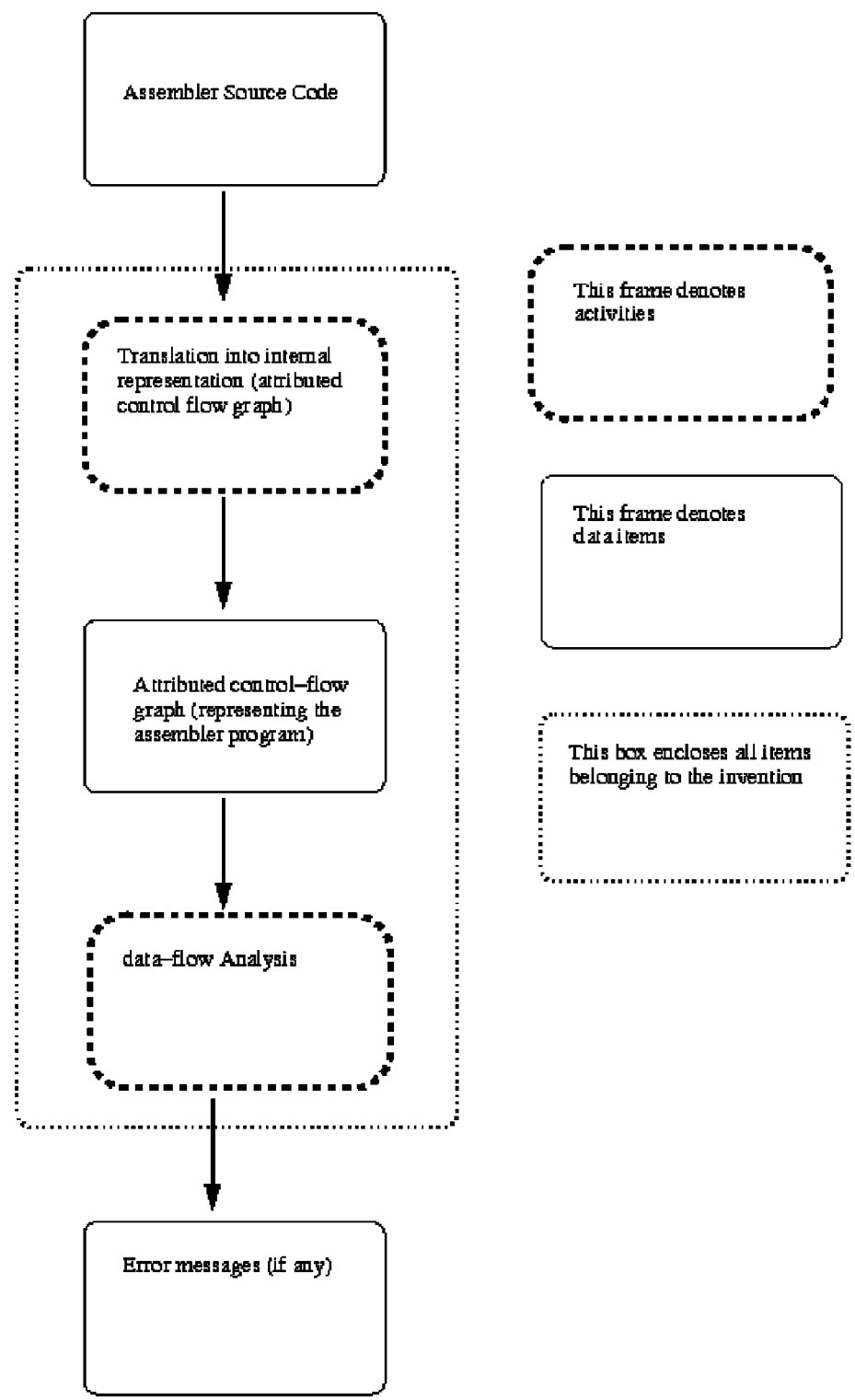
FIG. 3 shows the block diagram of the invention and its major components.

FIG. 3 shows a block diagram of a data processing system according to the invention. A method for finding problems that are caused by access to variables that are not fully initialized according to the present invention consists of the following steps:

1. Initially, the assembler program to be checked is available in source code form, e.g., as a text.

Figure 4:
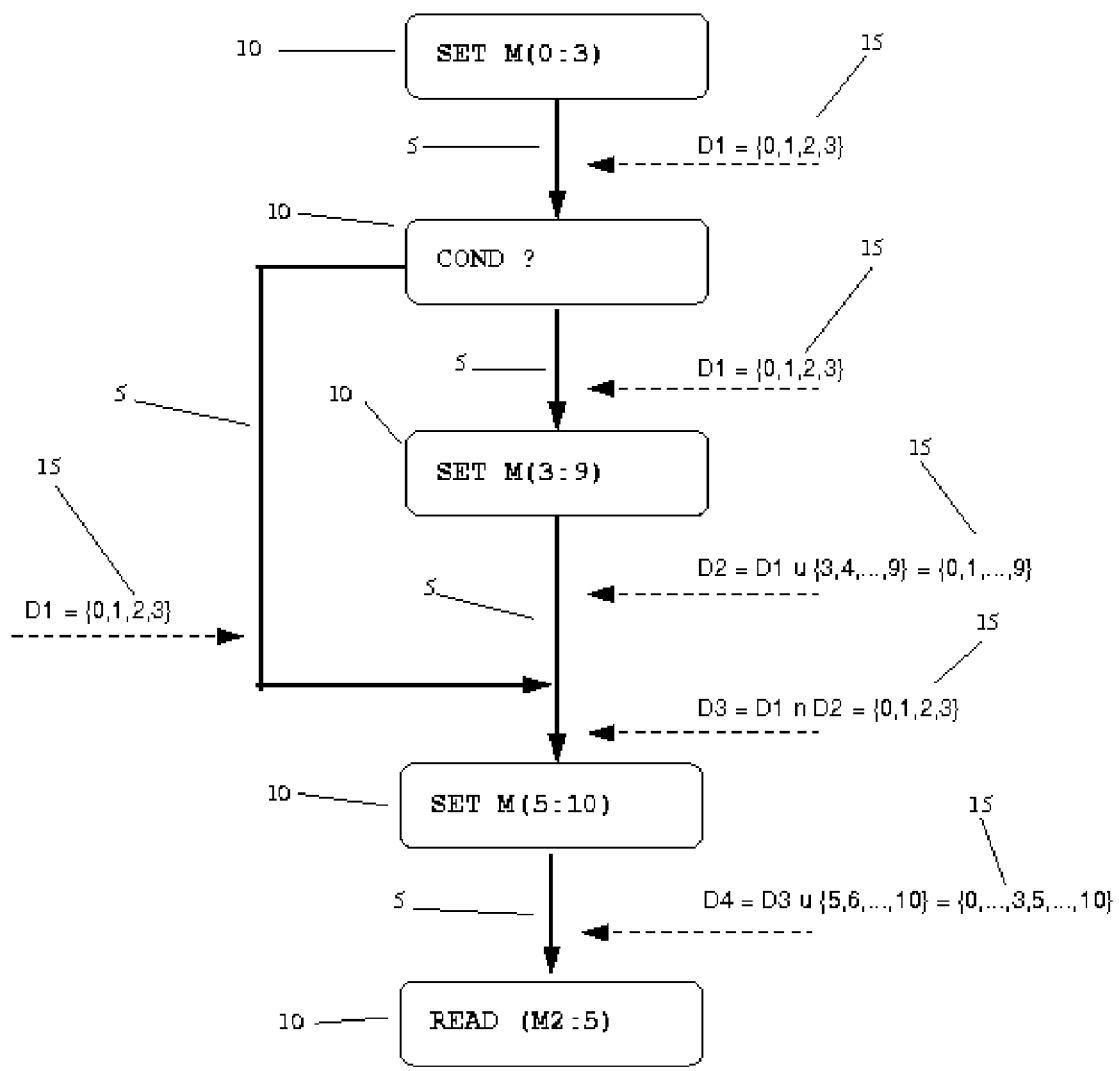
FIG. 4 shows an example of a control flow graph with added data flow information.

2. The next step is to read this text (FIG. 1) and translate the program into an internal representation which has the form of a control-flow graph (FIG. 4). This translation process is done using standard programming techniques like scanning and parsing which are known in the field of compiler construction (Compiler construction tools like e.g. "flex" and "bison" can be used to implement the code performing the translation.). The control-flow graph contains one node (10) for every statement found in the assembler program and a directed edge (5) for every possible flow of control.

3. The control-flow graph is annotated with data attributes D (15). These attributes are used to store the set of bits which are guaranteed to be hold a valid value.

4. Next, the data-flow analysis algorithm modified according to the invention performs the following steps:

4.1 It initializes these data attributes with the empty set as initial value. This value reflects the fact that no bit contains a useful value when the program starts and that the algorithm has not yet derived information about the possible initialization of some bits by the program.

4.2 The values of the data attributes are calculated using an iterative algorithm for solving data-flow equations. Data-flow equations previously used in other application areas (e.g., for optimizing compilers) are replaced. The new equations model the behaviour of assembler program execution with respect to the problem of partially initialized memory areas. In particular, the new equations reflect the following cases:

4.2a) Whenever an instruction sets certain bits of said memory area, the set appearing as data attribute contains the numbers denoting these bits after that instruction. The information which bits of a certain memory area a certain instruction writes is either obvious from the source code of the assembler program or is documented in the manufacturer's description of the processor.

4.2b) Whenever several possible flows of control join at a certain node, the data attribute available at that node is calculated by the meet-operation.

This informal description is given more precise in the form of some equations below. These equations are based on a modified flow-function, a modified meet-operator, and a modified in-function which are explained below in detail.

4.3 The iterative process of calculating the values for the data attributes applies the data-flow equations and consists of the following steps:

STEP1: assign the value 0 to variable C.

STEP2: calculate the new value for every data attribute by evaluating every data-flow equation. If the new value is different to the former value for at least one data attribute, assign the value 1 to variable C. The equations can be evaluated in any order.

STEP3: If variable C equals 1, then continue with STEP1. Otherwise, the data attributes now contain the final values.

Some mathematical properties (to be given below) of the procedure described in 4.1 and 4.2 guarantee that the procedure will finally terminate with correct results.

4.4. After having calculated the values of the data attributes, the invention checks for every instruction whether it accesses a bit which is not guaranteed to be initialized at that point.

4.5. For all instructions suffering from this problem, an error message is reported to the user.

The iterative procedure that is common to all previous applications of data-flow analysis is also used by the present invention. Additionally, the invention contains the following new functional components that are needed to calculate the values of the data attributes:

a) A new flow-function F that reflects for every possible assembler instruction what bits of a certain memory area the instruction will write.

b) A new meet-operation is defined such that it combines the data-flow information associated with uniting flows of control in a way that yields a conservative estimation of the initialization of the respective memory areas.

c) A new in-function is defined for every node in a way that it combines the data-flow information reaching via all incoming control-flow edges in a way that yields a conservative estimation of the initialization of the register to be checked. This combination of the information associated with incoming edges is performed by means of the newly defined meet-operator.

The following sections describe the algorithm in detail, starting with an extended example and finally verifying its formal correctness.

FIG. 4 continues the example that began in the section "Description and disadvantages of prior art" and used FIG. 1. FIG. 4 is annotated with the data-flow information referred to in step 3. These additional data fields are named data attributes. They represent the information "the set of the indices of the bits in the respective memory area that are guaranteed to be initialized" that was given informally in the introductory example. In general, there can be data attributes for as many memory areas as the application requires. The example uses just one attribute which refers to a memory area named M.

The data-flow analysis algorithm applied by the invention calculates the value of such data attributes that are valid at the beginning of every instruction.

Definition of the Meet-Operation

In general, programs are not restricted to linear sequences only. FIG. 4 shows an example control-flow graph with two possible flows of control joining at a node. The data attributes associated with the joining edges must be combined in some way. For the intended correctness check it is appropriate to make a worst-case assumption. The data attribute resulting from some joining edges therefore contains the set intersection of the data attributes associated with each edge.

In the example, the flow of control joins before the node labelled "SET M(5:10)". The data-flow information associated with the two joining edges is $D1=\{0, 1, 2, 3\}$ and $D2=\{0, 1, \ldots, 9\}$, respectively. Since both paths are possible at run-time, a safe assumption is that only their set intersection $D3=\{0, 1, 2, 3\}$ can be guaranteed to be initialized. Formally, this combination of information associated with some control flow paths that join at some point is performed by the meet-operation mentioned above.

Definition of the In-Function

The in-function mentioned above is applied to calculate the data-flow information valid at the beginning of any node. Its input data are the edges arriving at the node, the data-flow information valid at the nodes from where the flow of control might come, the flow function, and the meet-operation.

This framework is able to calculate exact values for the data-flow information for any node in the control-flow graph, even if this graph contains arbitrary edges (introduced by jump statements in the original assembler program, including any kind of cycles.

Mathematical Definition of the Data-Flow Equations

The algorithm for computing the data-attributes exploits some properties of an algebraic structure named lattice and is proven to produce correct results iteratively. Experience showed that it also executes quite efficiently.

The "pure" algorithm does not define what kind of information certain symbols would carry, nor what operations are defined on these symbols. It is only defined that these operations must meet certain properties. Well-known instantiations of this algorithm include a number of program analysis problems performed by compilers as a prerequisite for deciding which optimizations can be performed in a certain situation.

The following sections define a lattice and a set of equations which can be solved in order to calculate the value of all data attributes in every case.

For simplicity, let assume that there is only one single memory area to be checked. This is no restriction with respect to the power of the analysis algorithm proposed.

The lattice L consists of the set of all possible sets of bit indices within M, i.e. it s the powerset of $\{0, \ldots, max\}$. For $x, y \in L$ a meet operation is defined as follows:

$$x \sqcap y = y \cap y \quad (1)$$

This operation models joining control flow edges. A complete lattice definition would also contain a join operation which, however, is not needed for the purpose of the invention.

A control flow graph (CFG) contains a node for every instruction of the program being checked, and a directed edge for every possible flow of control. For every node N the function PRED returns the set of all nodes from which there is a control flow edge to n. The CFG has a special node named "entry" where the execution begins. For every node N there is a function in (N) which returns the value for the data attribute D associated with the node.

A flow function F models the effect of arbitrary instructions which either defines the contents of some of the bits from M by storing a value into them, or does not modify the contents of M:

$$F_{inst}(D) = \begin{cases} D \cup \{i, \ldots, j\} & \text{if } \mathit{inst} \text{ sets bits number } i \text{ to } j \\ & \text{within memory area } M \\ D & \text{otherwise} \end{cases} \quad (2)$$

To calculate the data-flow information D associated with every node N, a set of equations $D=in(N)$ is introduced whereby function in is given as $$in(n) = \begin{cases} 0 & \text{if } n \text{ is the entry} \\ \prod_{p \in PRED(n)} F_{inst\_p}(in(p)) & \text{otherwise} \end{cases} \quad (3)$$

where instP is the instruction associated with node P.

For the entry node where program execution starts the function always returns the empty set, reflecting the fact no bits of the respective memory area have been assigned a value yet.

Mathematical Correctness

The iterative algorithm described above will only work correctly if the lattice meets a certain condition. The flow functions F as defined by equation (2) must be monotone with respect to the partial order defined by:

$$\forall x, y \in L : (x \sqsubseteq y) \iff (x \sqcap y = x) \quad (4)$$

The definition of being monotone is $$\forall x,y \in L:(x \sqsubseteq y) \Longrightarrow (F(x) \sqsubseteq F(y)) \quad (5)$$

However, using equation (1), the equation (5) can be rephrased as $$\forall x,y \in L:(x \cap y = x) \Longleftrightarrow (F(x) \cap F(y) = F(x)) \quad (6)$$

From the definition of the flow functions in (2) it is obvious that (6) holds.

That which is claimed is:

1. Method for detecting problems caused by access to incompletely initialized data storage in assembler programs comprising:
   generating an internal representation of control flow of the source code of the assembler program by using standard techniques of compiler constructions, wherein said internal representation contains nodes for every statement found in said source code and a directed edge for every possible flow of control between said nodes;
   attributing data attributes to said nodes and/or said edges, wherein said data attributes are used to store information about which bits within the data storage can be guaranteed to be initialized;
   applying a data-flow analysis method to said internal representation of the control flow of the source code for determining which bits of the data storage can be guaranteed to be initialized, wherein said applying further comprises:
      initializing all of said attributes of said internal representation of the control flow of the source code with an initial value;
      providing access to the set of numbers denoting bits read by said statement associated to said node, the set of number identifying the bits written by said statement, and all attributes of the nodes from which a directed edge to said node for the attribute is currently being calculated;
      calculating for each of said nodes a value for said attribute associated to said node based on said parameters; and
      repeating said calculating until for all attributes the newly computed value remains unchanged;
   checking for each node whether the instruction reads bits that are not guaranteed to be initialized;
   generating one or more error messages responsive to said problem; and
   recording which statement is the reason why certain bits of the data storage are not initialized; and
   wherein said calculation of said values additionally provides information about which statement is the reason why certain bits of the respective data storage are not initialized in addition to a report of the accesses to the only partly initialized data storage.

2. Method according to claim 1, wherein said internal representation of said control flow of the source code is represented in a form of control flow graph, wherein said nodes in said control flow graph may represent basic blocks which summarize the sequence of statements which will be executed by said control flow in a linear sequence.

3. Method according to claim 1, wherein said internal representation of said control flow of said source code is constructed according to the principles of static single assignment form.

4. Method according to claim 1, wherein said initial value of said attribute is the empty set.

5. Method according to claim 1, wherein said action to be taken is to display the instructions erroneously access to the partially initialized memory area to user by means of a user interface.

6. Method according to claim 5, wherein said access to an only partly initialized memory area is displayed by the line number of the statement.

7. An article of manufacture comprising: at least one non-transitory computer usable medium having computer readable program code logic to detect problems caused by access to incompletely initialized data storage in assembler programs, said computer readable program code logic when executing performing the following:
   generating an internal representation of control flow of the source code of the assembler program by using standard techniques of compiler constructions, wherein said internal representation contains nodes for every statement found in said source code and a directed edge for every possible flow of control between said nodes;
   attributing data attributes to said nodes and/or said edges, wherein said data attributes are used to store information about which bits within the data storage can be guaranteed to be initialized;
   applying a data-flow analysis method to said internal representation of the control flow of the source code for determining which bits of the data storage can be guaranteed to be initialized, wherein said applying further comprises:
      initializing all of said attributes of said internal representation of the control flow of the source code with an initial value;
      providing access to the set of numbers denoting bits read by said statement associated to said node, the set of number identifying the bits written by said statement, and all attributes of the nodes from which a directed edge to said node for the attribute is currently being calculated;
      calculating for each of said nodes a value for said attribute associated to said node based on said parameters; and
      repeating said calculating until for all attributes the newly computed value remains unchanged;
   checking for each node whether the instruction reads bits that are not guaranteed to be initialized;
   generating one or more error messages responsive to said problem; and
   recording which statement is the reason why certain bits of the data storage are not initialized; and
   wherein said calculation of said values additionally provides information about which statement is the reason why certain bits of the respective data storage are not initialized in addition to a report of the accesses to the only partly initialized data storage.

8. The article of manufacture of claim 7, wherein said internal representation of said control flow of the source code is represented in a form of control flow graph, wherein said nodes in control flow graph may represent basic blocks which summarize the sequence of statements which will be executed by said control flow in a linear sequence.

9. The article of manufacture of claim 7, wherein said internal representation of said control flow of said source code is constructed according to the principles of static single assignment form.

10. The article of manufacture of claim 7, wherein said initial value of said attribute is the empty set.

* * * * *